March 18, 1958
A. C. F. MASON
2,827,365
DEVICE FOR BRINGING REACTANTS TOGETHER
WITHIN A CLOSED SYSTEM
Filed July 13, 1954
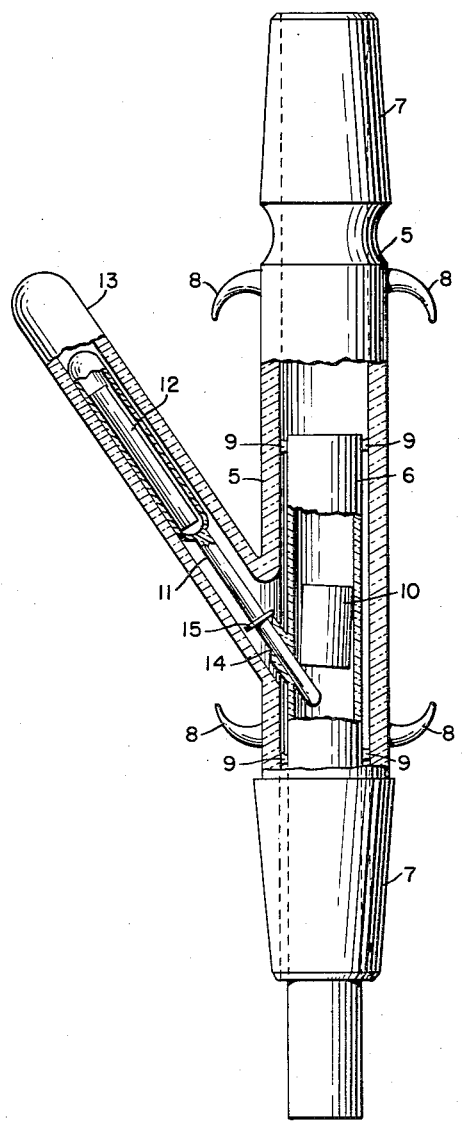
INVENTOR
AUSTIN C. F. MASON
BY
*R. Hoffman*, ATTORNEY

United States Patent Office 2,827,365
Patented Mar. 18, 1958

2,827,365

DEVICE FOR BRINGING REACTANTS TOGETHER WITHIN A CLOSED SYSTEM

Austin C. F. Mason, New Orleans, La.

Application July 13, 1954, Serial No. 443,173

4 Claims. (Cl. 23—259)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to a device for initiating a chemical reaction by bringing together one or more reactive materials within a closed system.

In various chemical processes it is desirable to initiate a reaction within a closed system without in any way changing the type or amount of the components of the atmosphere within the system. For example, in quantitative hydrogenation procedures such as the procedure described by F. C. Pack and R. W. Planck in J. Amer. Oil Chem. Soc., 30, 461–463, November 1953, the hydrogenation reaction is initiated in a closed system filled with hydrogen gas and the analytical determination is based upon the change in the volume of gas. In such processes it is very important that the reactants be mixed together, so that reaction occurs, without in any way disrupting the seals which isolate the system from the atmosphere. Such processes are generally conducted in an all-glass apparatus in which the various units are joined by ground glass joints.

The devices heretofore used to mix together the reactants within such a closed system are usually devices which are activated by turning one section of a ground glass joint within another. Such a method of activation involves the disadvantage that, if the joint which must be turned is well lubricated, the lubricant is apt to contaminate the system, and, if the joint is not well lubricated, the joint may become very difficult to turn, or turning it may allow gas to enter or leave the system.

A primary object of the present invention is to provide a device for mixing together reactants within a closed system, which device is activated without any movement of any ground glass joint. A further object is to provide a device which is adaptable for mixing together widely varying volumes of reactants and for mixing together different reactants in a sequential series. Other objects and advantages of the invention will be apparent from the following description and claims.

The present invention provides a device for mixing reactants together within a closed system, comprising: at least one open top reactant container; a reactant container guide tube, which is large enough to receive the reactant container and to allow it to pass through the tube, but which is small enough to prevent the reactant container from turning over within the tube; at least one opening in the side of the reactant container guide tube, which opening is adapted to receive a rod large enough to support the reactant container; and an enclosing tube, which surrounds and is attached to the outside of the reactant container guide tube, which is provided with ends adapted for attachment into a chemical apparatus to provide a vapor-tight system, and which is provided with a closed side arm adjacent to each opening in the side of the reactant container guide tube; and a rod large enough to support a reactant container, which rod is attached to a body of ferromagnetic material, and is slidably contained within each side-arm of the enclosing tube and arranged to slide through the adjacent opening in the side of the reactant container guide tube, to provide a removable support for a reactant container within the reactant container guide tube.

The drawing is a schematic illustration of an all-glass device for mixing reactants together within a closed system constructed in accordance with this invention.

Referring to the figure, the outermost tube, tube 5, is the enclosing tube which surrounds and is attached to the reactant container guide tube, tube 6. The ends of tube 5 are provided with sections of standard taper ground glass joints, joint sections 7. Spring hooks 8 are attached to tube 5, close to the joint sections 7, to provide means for attaching the usual resilient members for insuring a vapor-tight union between the sections of ground glass joints.

The ends of the enclosing tube can be attached to sections of substantially any type of the joints usually used to connect the elements of a chemical apparatus. The diameter and length of the enclosing tube can be varied widely to adapt the device for mixing the desired amount of reactant, and/or for sequentially mixing more than one reactant. In general, the lower end of the enclosing tube is attached to a reaction vessel, not shown, and the upper end is attached to vapor measuring and/or condensing vessels, not shown.

The reactant container guide tube, tube 6, is fixedly attached inside of tube 5 by glass rods 9. Any of the usual methods of attaching one tube inside of another can be used to attach the guide tube inside of the enclosing tube. The relative sizes of the guide tube and the enclosing tube can be varied widely, but the guide tube is preferably only slightly smaller in diameter than the enclosing tube. The lower end of the guide tube preferably extends at least as far as the lower end of the enclosing tube, so that the reactant container can easily be inserted and the reactant it contains is guided into the center of the reaction vessel.

The reactant container is container 10. This container can be any open top container adapted to hold liquid or solid reactants. The substantially cylindrical micro beakers are particularly suitable. The reactant container is supported within tube 6 by the end of rod 11 which protrudes far enough inside of tube 6 to prevent the passage of the container.

Rod 11 can be a solid or hollow rod large enough and strong enough to support the reactant container. The upper end of rod 11 is attached to a body of ferromagnetic material, material 12, and the rod is slidably contained within side arm 13 of the enclosing tube, tube 5. The body of ferromagnetic material is preferably sealed inside of rod 11 in the usual manner of sealing metallic materials within glass. The ferromagnetic material is preferably a rod-shaped permanent magnet, and is preferably sealed within a chamber in rod 11 in which it is free to undergo a small amount of endwise motion. By means of such a freedom of motion the magnet can be moved back and forth to provide a jarring to overcome any resistance entailed in moving rod 11.

The lower end of rod 11 is arranged to enter the reactant container guide tube, tube 5, through opening 14 in the side of tube 5. The opening 14, is preferably the end of a very short open side arm, just long enough so that, when rod 11 is withdrawn from tube 6 far enough to remove the rod from within the tube, the end of the rod is enclosed in the side arm. Rod 11 is preferably provided with collar 15 adapted to limit the distance the rod will slide into tube 5, and thus, to limit the amount of rod which must be withdrawn from under the reactant container supported by the rod.

In using the device provided by the invention the reactant to be mixed is placed in the reactant container 10, and the container is inserted into tube 6 and seated upon the end of rod 11. After the reactant container has been so inserted, tube 5 is joined into the apparatus in which the reaction is to be conducted. The apparatus is then assembled and the atmosphere within the apparatus is adjusted to that desired for the reaction. The reaction is initiated by bringing a source of electromagnetic force close to the piece of ferromagnetic material 12, and, by means of the magnetic attraction, pulling the end of rod 11 from under reactant container 10, to allow the container to fall into the reaction vessel.

I claim:

1. A device for mixing reactants together within a closed system in an all-glass apparatus, comprising: at least one open top reactant container; a reactant container guide tube which is large enough to receive the reactant container and to allow it to pass through the tube, but which is small enough to prevent the reactant container from turning over within the tube; at least one opening in the side of the reactant container guide tube, which opening is adapted to receive a rod large enough to support the reactant container; an enclosing tube, which surrounds and is attached to the outside of the reactant container guide tube, which is provided with ends adapted for attachment into a chemical apparatus to provide a vapor-tight system, and which is provided with a closed side arm adjacent to each opening in the side of the reactant container guide tube; and a rod large enough to support a reactant container, which rod is attached to a glass-enclosed body of ferromagnetic material and is slidably contained within each side-arm of the enclosing tube and arranged to slide through the adjacent opening in the side of the reaction container guide tube, to provide a removable support for a reactant container within the reactant container guide tube.

2. The device of claim 1 in which the ferromagnetic material is a rod-shaped permanent magnet.

3. The device of claim 2 in which the reactant container is a micro beaker.

4. The device of claim 2 in which the openings in the side of the reactant container guide tube are short side arms and the rods which they are adapted to receive are provided with collars which limit the distance the rods will slide into the reactant container guide tube.

References Cited in the file of this patent

UNITED STATES PATENTS

| | | |
|---|---|---|
| 1,777,670 | Hausman | Oct. 7, 1930 |
| 2,319,193 | Walter | May 11, 1943 |
| 2,609,974 | Brous | Sept. 9, 1952 |
| 2,658,819 | Formwalt | Nov. 10, 1953 |

OTHER REFERENCES

Joshel: "Ind. and Eng. Chem., Anal. Ed.," vol. 15, September 15, 1943, pages 590 and 591. (Copy in Div. 59.)

Pack et al.: "J. of American Oil Chemists Society," vol. 30, November 1953 issue, pages 461–463.

Hoogland: "Analytical Chemistry," vol. 25, April 1953, page 685.